(No Model.) 2 Sheets—Sheet 2.

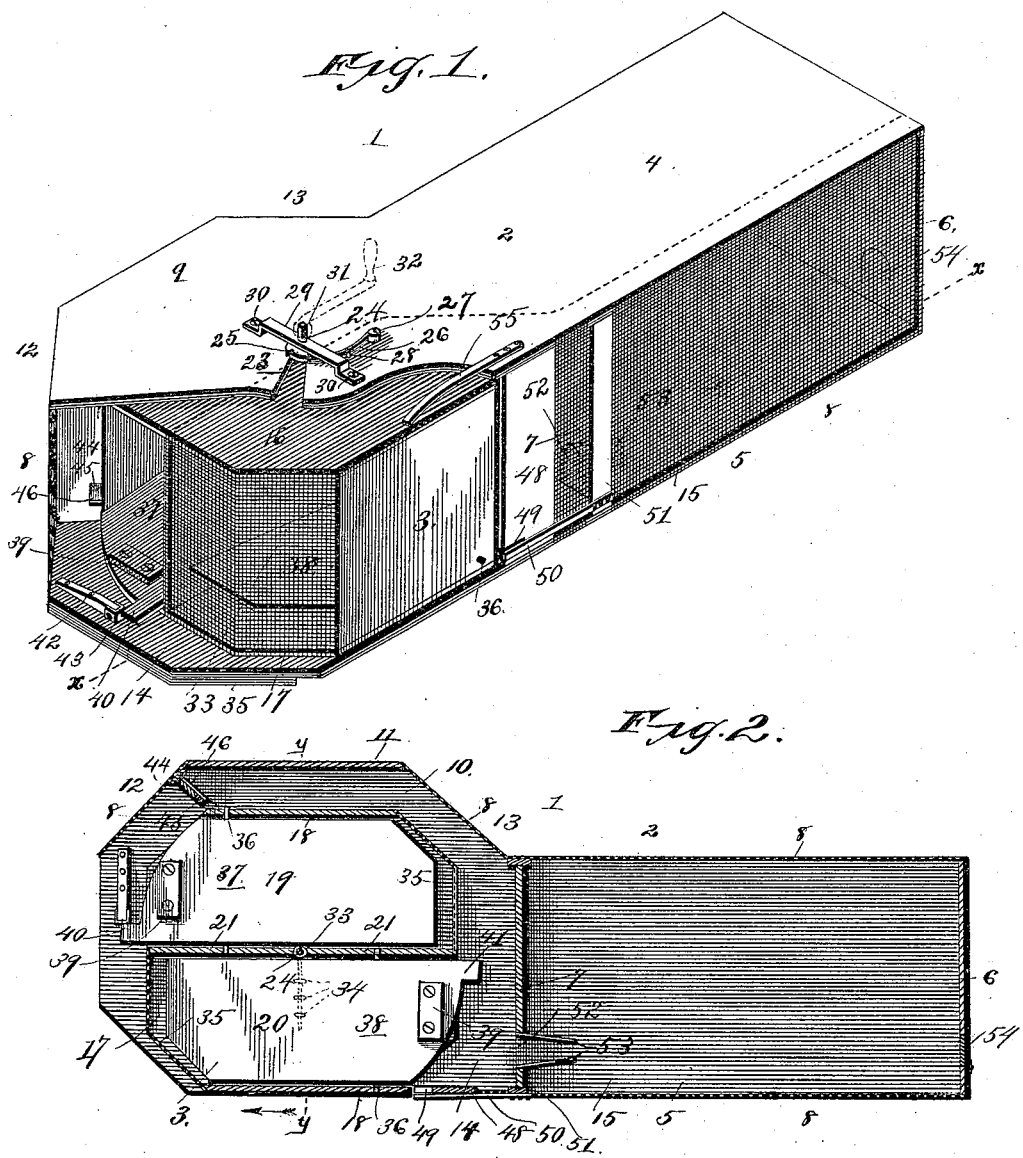

J. W. MURPHY & J. LENNON.
ANIMAL TRAP.

No. 450,471. Patented Apr. 14, 1891.

Witnesses
Geo. M. Dope
H. E. Price

Inventor
J. W. Murphy
Jos. Lennon
By their Attorneys
Higdon & Higdon

UNITED STATES PATENT OFFICE.

JOHN W. MURPHY AND JOSEPH LENNON, OF KANSAS CITY, MISSOURI.

ANIMAL-TRAP.

SPECIFICATION forming part of Letters Patent No. 450,471, dated April 14, 1891.

Application filed December 19, 1890. Serial No. 375,245. (No model.)

*To all whom it may concern:*

Be it known that we, JOHN W. MURPHY and JOSEPH LENNON, of Kansas City, Jackson county, Missouri, have invented certain new and useful Improvements in Animal-Traps, of which the following is a full, clear, and exact description, reference being had to the accompanying drawings, forming a part hereof.

Our invention relates to an improvement in animal-traps; and it consists in the peculiar combination and arrangement of its devices, as described and illustrated in the accompanying specifications and drawings, in which—

Figure 3:
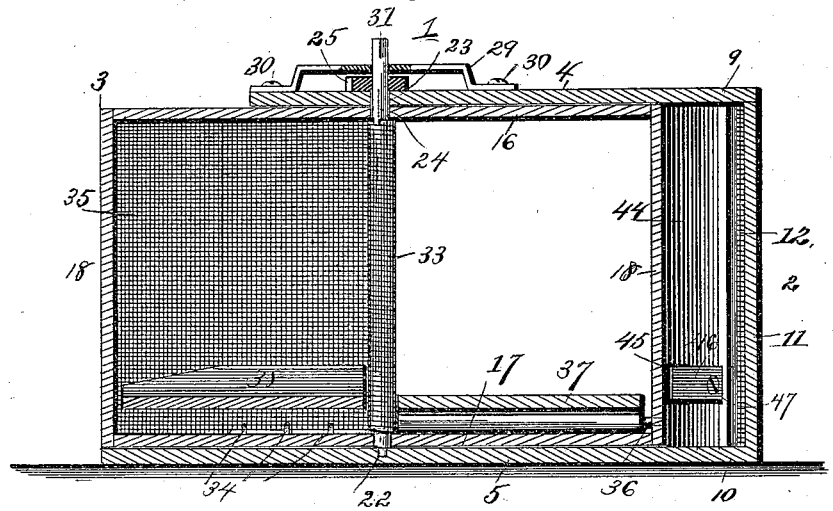
Figure 4:
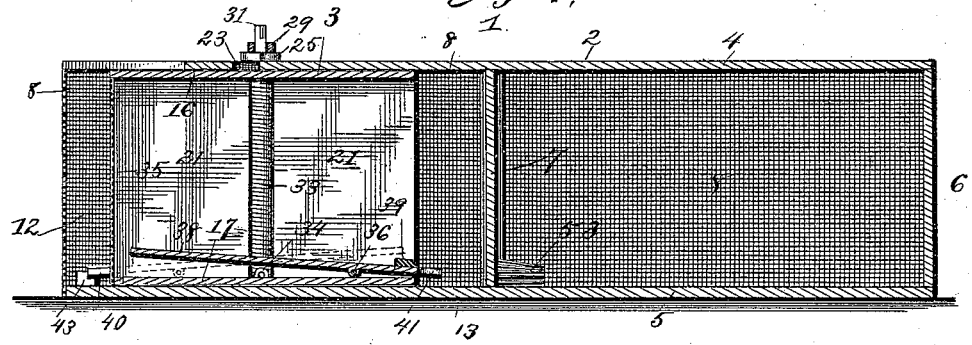
Figure 5:
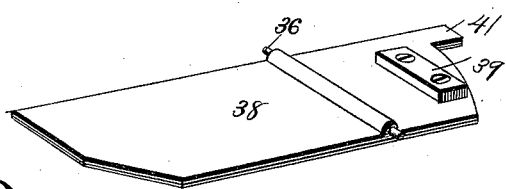

Figure 1 represents a perspective view of our invention. Fig. 2 is a horizontal sectional view of the same. Fig. 3 is an enlarged vertical cross-sectional view of the same, taken on the line $y\ y$ of Fig. 2 and looking in the direction of the arrow. Fig. 4 is a vertical longitudinal section of the line $x\ x$ of Fig. 1. Fig. 5 is an inverted perspective view of one of the pivotal latches or foot-boards having a suitable weight secured to the under side of its forward end.

Similar figures refer to similar features throughout the several views, in which—

1 represents a rat-trap consisting of the casing 2 and the revolving cage 3, secured therein in a suitable manner. The casing 2 consists of the horizontal walls 4 and 5, connected together at their rear ends by the wall 6 and midway of their length by the transverse partition or wall 7, said intermediate side space being covered by a wire-netting 8 or other suitable means. The walls 4 and 5 are provided with the vertically-aligned projecting side portions 9 and 10, connected at their outer sides by the wall 11, the inclined sides 12 and 13 being connected by wire-netting 8 in a manner similar to that described. The partition 7 forms the two compartments 14 and 15.

The cage 3 consists of the horizontal walls 16 and 17, connected together by the vertical and longitudinally-extending side walls 18 18, and is divided into two compartments 19 and 20 by the central longitudinally-extending walls 21, between which and projecting vertically through the lower horizontal wall 17 of the cage 3, resting in a suitable recess 22 in the lower wall 5 of the casing at its lower end, and projecting at its upper end through the upper wall 16 of the cage through the open slot 23 of the upper wall 4 of the casing, is the vertical shaft or rod 24, which has keyed or otherwise rigidly secured thereon the ratchet-wheel 25, engaged by a suitable spring 26, pivoted on bolt 27 at its rear end to the upper wall of said casing, and held from displacement at its forward end by the upstanding pin or projection 28. The shaft 24 also projects through the bracket 29, secured at its opposite end by screws 30 to the casing, and is squared at 31 for the reception of the crank-handle 32, (shown in dotted lines at Fig. 1,) the object of which will be presently explained. Coiled round this rod or shaft 24 between vertical walls 21 is a spring 33, the upper end of which is secured permanently or rigidly to said shaft, and the lower end is secured by staples 34 or in other suitable manner to the floor of lower horizontal wall 17 of the cage 3. The cage is also provided at diagonally-opposite corners with the wire-netting 35, leaving the forward side of each compartment 19 and 20 open.

Pivotally arranged on the transversely-extending-rods 36 36, near the forward and lower ends of compartments 19 and 20, are the latches or foot-boards 37 and 38, which are weighted at their forward or shorter ends at 39, and are also provided at the same end with the projecting shoulders 40 41, one of which is adapted to always engage, when in their normal positions, the stop block or bar 42, secured by screws or in other suitable manner to the floor of the forward compartment of the casing near it forward edge. This bar 42 is provided with a wear-plate 43 thereon.

Extending inwardly from the inclined side 12 of the casing is a wall or projection 44, provided in its forward edge with a notch 45, adapted to be normally closed by a leaf-spring 46, secured by screws 47, or in other suitable manner, at one end to the rear side of the said partition. Diagonally opposite said partition the casing is provided with the vertical strip 48, provided in its forward edge with a notch 49, which is normally closed by the forward free end of a leaf-spring 50, which is secured at its rear end to the strip 51.

The partition 7 is provided with an opening or perforation 52, opposite the open end of the compartment 19 and 20 of the cage when said open end is pointing toward the partition 7 or toward the rear end of the casing, from which extends rearwardly and toward each other in a slightly-conical manner the pointed leaf-springs 53.

The rear or end wall of the casing is provided with a door 54, through which the animals must be taken from the trap. A leaf-spring 55 is secured at its rear end to the upper wall of the casing, and has its forward free end bearing upon the upper surface of the upper wall of the cage to guide it in its revoluble movement.

The operation of my invention is as follows: The bait is placed in the rear of the compartment 19 (when the trap is in the position shown in the drawings) upon the upper inclined end of the latch or foot-board 37, the forward-projecting shoulder 40 of which bears against the wear-plate of stop-bar 42, the weight 37 holding it in such depressed position. The rat entering the compartment 19 passes over the pivotal point of said latch or foot-board toward the bait, causing the depression of the rear or elevated end and releasing the forward end or shoulder 40 from its engagement with stop-bar 42, which immediately on disengagement allows the cage 3, actuated by the spring 33, secured at opposite ends to the vertical shaft and to the floor or lower horizontal wall of the cage, to revolve swiftly until the projecting end or shoulder 41 of compartment 20 assumes its position against the stop-bar 42, when the rat, seeing the opening 52 before him, passes through and between the conically-arranged springs 53 into the compartment 15, the said spring-arms allowing him to pass readily through, but preventing him, by reason of their conical arrangement and pointed ends, from escaping thence through the opening by which he entered. The shoulders 40 and 41 during the revolution of the cage pass through the notches 45 and 49 of partitions 44 and 48, forcing the free ends of the leaf-springs 46 and 50 outwardly until said shoulders are beyond engagement with said springs, when the springs resume their normal position, closing the notches and preventing the escape of the animal in that direction. The cut-away portion 23, inclosing at its rear end the shaft 24, is to allow by removing the bracket 29 the removal of the cage from the casing without any difficulty. After being revolubly operated a few times the coiled spring 33 may need rewinding, and to accomplish this end we provide the squared upper end 31 of the shaft 24, which may be engaged by the crank-handle 32, as will be readily understood. We may also secure our weights 37 on the upper surface of the short arm of the pivotal latches or foot-boards, as illustrated.

Having thus described our invention, what we claim as new, and desire to secure by Letters Patent, is—

1. In an animal-trap consisting of casing 2, constructed as described and provided with the partition 7, providing said casing with the compartments 14 and 15, the compartment 14 being provided with the diagonally-opposite walls 44 and 48, provided near their lower ends with suitable notches 45 and 49, closed by means of suitable leaf-springs 46 and 50, substantially as and for the purpose set forth.

2. In an animal-trap, the revoluble cage 3, consisting of the horizontal walls 16 and 17, suitably connected at their opposite sides by vertical walls 18 and divided centrally by the longitudinal partition 21, the opposite end of said partition 21 being connected by wire-netting or other suitable material 35 to the opposite and adjacent end of vertical side walls 18, substantially as described.

3. The combination, with the casing 2, of the revoluble cage consisting of the lower and upper horizontal walls connected by the side walls and the central longitudinal partition 21 and by the diagonally-opposite wire-netting 35, through the medium of the vertically-arranged shaft 29, the lower end of said shaft resting in the cylindrical notch or recess 22 of the casing and having its upper end projecting through the notch or cut-away portion 23 of the casing, and the spring 33, coiled round said shaft and secured at its lower end by staples 32 or other suitabe means to the floor or lower horizontal wall of the cage and having the upper end of the spring rigidly secured in an opening in the shaft or in other suitable manner, substantially as described.

4. In an animal-trap, the combination, with a casing through the spring-actuating rod or shaft 24, of the revoluble cage 3, constructed as described, and the partition 21, forming the compartments 19 and 20, each provided with the latches or foot-boards pivoted near their forward ends on transverse rods 36, journaled at opposite ends in the side walls and partitions 21, respectively, the forward ends of said latches or foot-boards being weighted and provided with a shoulder or projecting portion 40 and 41, substantially as and for the purpose set forth.

5. The combination of the casing provided with the forward open-end compartments 14, having a stop-bar 40 near the forward end of the lower horizontal wall 5 thereof, and the vertically-extending partitions or walls 44 and 48, having notches in their lower ends adapted to be normally closed by leaf-springs 46 and 50 of a revoluble spring-actuated cage 3, through the mediums of projecting shoulders or ends 40 and 41 of pivotal latches or foot-board 37 and 38 engaging alternately as the cage is revolved, the stop-bar 40, and free ends of leaf-springs 46 and 50, covering notches 45 and 49, substantially as described.

6. In a trap, the combination, with a stationary casing having an apertured partition therein dividing it into two compartments, of a revolving casing contained in one of the said compartments and having two oppositely-opening compartments, a spring adapted to actuate the said revolving casing, and a pivoted bottom in the said compartments of the revolving casing adapted to engage the said stationary casing and to hold the revolving casing against rotation, as described.

7. In a trap, the combination, with a casing having an apertured partition therein dividing it into two compartments, of a revolving casing contained in one of the said compartments and having two oppositely-opening compartments therein, a spring adapted to actuate the said revolving casing, and a tripping mechanism contained within the said revolving casing and adapted to hold it against rotation, as described.

In testimony whereof we affix our signatures in presence of two witnesses.

JOHN W. MURPHY.
JOSEPH LENNON.

Witnesses:
SAMUEL STONER,
H. E. PRICE.